(12) United States Patent
Richmond et al.

(10) Patent No.: US 9,475,718 B2
(45) Date of Patent: Oct. 25, 2016

(54) WATER PURIFICATION SYSTEM AND PROCESS WITH WATER PRETREATMENT APPARATUS

(71) Applicants: John O. Richmond, Toronto (CA); Frederick J. Dart, Mississauga (CA)

(72) Inventors: John O. Richmond, Toronto (CA); Frederick J. Dart, Mississauga (CA)

( * ) Notice: Subject to any disclaimer, the term of this patent is extended or adjusted under 35 U.S.C. 154(b) by 402 days.

(21) Appl. No.: 13/986,450

(22) Filed: May 6, 2013

(65) Prior Publication Data
US 2014/0326667 A1    Nov. 6, 2014

(51) Int. Cl.
| | | |
|---|---|---|
| C02F 1/48 | (2006.01) |
| C02F 9/00 | (2006.01) |
| C02F 1/68 | (2006.01) |
| C02F 5/02 | (2006.01) |
| C02F 1/00 | (2006.01) |
| C02F 1/52 | (2006.01) |
| C02F 1/44 | (2006.01) |
| C02F 1/28 | (2006.01) |
| C02F 103/08 | (2006.01) |
| C02F 101/10 | (2006.01) |

(Continued)

(52) U.S. Cl.
CPC ................ C02F 9/00 (2013.01); *C02F 1/281* (2013.01); *C02F 1/38* (2013.01); *C02F 1/441* (2013.01); *C02F 1/463* (2013.01); *C02F 1/48* (2013.01); *C02F 1/481* (2013.01); *C02F 1/688* (2013.01); *C02F 5/02* (2013.01); *C02F 2001/007* (2013.01); *C02F 2001/5218* (2013.01); *C02F 2101/10* (2013.01); *C02F 2101/30* (2013.01); *C02F 2103/08* (2013.01); *C02F 2201/48* (2013.01); *C02F 2301/026* (2013.01); *C02F 2303/08* (2013.01); *C02F 2303/22* (2013.01)

(58) Field of Classification Search
CPC .... B01D 2321/24; C02F 1/281; C02F 1/441; C02F 1/481; C02F 1/484; C02F 1/487; C02F 1/483; C02F 1/485; C02F 1/38; C02F 1/385; C02F 1/58; C02F 1/4602; C02F 1/042; C02F 2001/007; C02F 2001/46152; C02F 2101/10; C02F 2101/30; C02F 2101/32; C02F 2103/08; C02F 2103/023; C02F 2201/48; C02F 2201/483; C02F 2201/328; C02F 2301/026; C02F 2301/046; C02F 2303/22; C02F 2303/08; C02F 9/00
See application file for complete search history.

(56) References Cited

U.S. PATENT DOCUMENTS 2,921,969 A * 1/1960 Loy ................ B01D 9/0009
                                               210/187
3,891,394 A * 6/1975 Smith ................ B01D 9/0013
                                               159/DIG. 13

(Continued)

OTHER PUBLICATIONS

A.F. Ganz, Electrolysis from Stray Electric Currents, in Proceedings of the 43rd Meeting of the New England Association of Gas Engineers—Official Report, 98 Am. GAS J. pp. 186, 187 (1913).*

*Primary Examiner* — Krishnan S Menon
*Assistant Examiner* — Brad Gordon

(57) ABSTRACT

A water purification apparatus for treating water containing at least some organic contaminants, and having a pretreatment device for removing organic contaminants from a water stream, and having a spin up bowl; a recovery bowl; an annular flow passage between the bowls; a magnetic member around the flow passageway; a magnetic body positioned adjacent to the member wherein the magnetic member and the magnetic body define a restricted annular flow passageway between them for flow of water from the spin up bowl to the recovery bowl; Also disclosed is a method of water treatment using the apparatus.

11 Claims, 3 Drawing Sheets

(51) Int. Cl.
    *C02F 101/30* (2006.01)
    *C02F 1/38* (2006.01)
    *C02F 1/463* (2006.01)

(56) References Cited

U.S. PATENT DOCUMENTS

| | | | | |
|---|---|---|---|---|
| 4,422,933 A | * | 12/1983 | Sverre | C02F 1/481 |
| | | | | 210/222 |
| 5,006,214 A | * | 4/1991 | Burchnell | C23F 13/02 |
| | | | | 204/196.16 |
| 5,480,522 A | * | 1/1996 | Ibbott | C02F 1/005 |
| | | | | 204/248 |
| 5,997,812 A | * | 12/1999 | Burnham et al. | 422/24 |
| 2003/0070991 A1 | * | 4/2003 | Hatton | 210/695 |
| 2003/0173304 A1 | * | 9/2003 | David Joslin | B01D 24/14 |
| | | | | 210/702 |
| 2005/0011839 A1 | * | 1/2005 | Dart | C02F 1/505 |
| | | | | 210/764 |
| 2006/0231503 A1 | * | 10/2006 | Flettner | C02F 1/48 |
| | | | | 204/248 |

* cited by examiner

WATER PURIFICATION SYSTEM AND PROCESS WITH WATER PRETREATMENT APPARATUS

FIELD OF THE INVENTION

The invention relates to the purification of water, such as in reverse osmosis systems, and in particular to such a system incorporating the pretreatment of water prior to actual purification.

BACKGROUND OF THE INVENTION

During processes for separating water from solute-filled sources, such as seawater, the removal of water molecules from the raw water supply, to produce purified water generates secondary waste streams. The waste streams have selective solute concentrations variously reaching saturation and even super saturation levels. Such solutes are of both mineral and organic composition. These may deposit as precipitation solids whenever and wherever the water makes its actual separation from the process stream, such as within the matrix of any reverse osmosis (RO) membranes being used for processes. These deposits clog the membranes of RO systems. The periodic cleaning of membrane surfaces thus becomes standard practice to keep flows through the membranes at acceptable flux rates. Chemical cleaning does restore a considerable percentage of the original process rate. However it is inevitable that deteriorating recovery flux rates will result after each cleaning cycle. This will eventually require complete membrane replacement.

Cleaning cycle chemicals do essentially remove much of the inorganic scale accumulations. However many slower accumulations of organic contaminants within such membranes are not removed by cleaning. This is because any formulation strong enough to remove the organics would also be strong enough to attack the organic matrices of the membranes themselves.

It is therefore desirable to prevent organic contaminants from even entering operating membranes in the first place.

The type of organics that invade and plug up a membrane film might be characterized as similar to the slippery, gelatinous slimes that evolve naturally off of fish, seaweed, algae, bacteria, and the like. These have only slight hydrophilic solubilities and will form solidified gels once enough water has left them behind within the membrane. Once dehydrated, the jellied organics become insolubly locked in place with no suitable solubilizing reagents able to remove them.

The invention seeks to alleviate these problems by pretreating the water prior to contact with the membranes to cause much of these organics to settle out from the water stream. This is achieved by creating a growth of fine calcium carbonate [$CaCO_3$] particulates which are absorptive of up to 80% of any soluble natural organics (including brown tannins as exampled in brewed tea or natural brown waters).

The invention makes use of the calcium bicarbonates which are naturally found in the water stream and provides conditioners which use turbulent motion within magnetic or electric fields to rip and separate the hydrogen ions [$H^+$] away from the bicarbonate ions [$HCO3^-$] thus forming temporary increases in the formation of extra carbonate ions [$CO_3^=$] in the water.

One form of such a conditioner is shown in an earlier magnetic device (U.S. Pat. No. 4,422,933).

The conditioner in accordance with the present invention is a major improvement on such earlier device. The present invention provides an adjustable-flow magnetic field device. The device further will allow major increases in flow volume capacity. Magnetic devices maintain an advantage with salt water where electrical fields are strongly blocked by water conductivity as compared to magnetic field systems.

The large, though temporary, increases of the carbonate content in the water usually finds enough calcium ion [$Ca^{2+}$] in most waters to supersaturate the water with respect to forming fine calcium carbonate [$CaCO_3$] scale precipitates. Simple chemical equations, such as below represent these conditioner reactions which may prevail for only about three seconds before the chemistry snaps back to normal pH-controlled ratios:

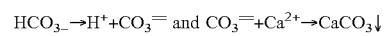

$$HCO_{3-} \rightarrow H^+ + CO_3^= \text{ and } CO_3^= + Ca^{2+} \rightarrow CaCO_3\downarrow$$

Organic contaminants will be absorbed by the calcium carbonate, (as largely formed into a buoyant suspension of fine particulates. The organic solutes most readily trapped within membranes generally are those most easily captured by the carbonate particulates.

While the absorption of organics on the precipitating calcium carbonate is a highly effective method of removing a large proportion of such organic contaminants, it needs to be recognized that the growth of the carbonate crystals from the water is very much more effective than just contacting or dumping preformed calcium carbonate powder into the flow. The latter merely achieves a limited absorption of organics on the original preformed surfaces of the powder, whereas the active growing of the carbonate from the soluble state absorbs organics at each layer of growing crystal formation as those crystals get assembled. Absorptions thus end up throughout the entire volume of the carbonate crystals, rather than just on the outside surface areas. The result is an increase in capture sites for organics by at least a 100-fold. Additionally, once the problem organics become incorporated within such scale particulates, they no longer have access to enter pore membranes to cause problems, and are further denatured by essential de-watering so that their original problematic qualities of being jelly-like or slimy can no longer be reestablished.

The invention when treating larger seawater flows with enhanced effectiveness, represents more than just a minor improvement in water quality for subsequent reverse osmosis and other applications. Depending somewhat on local raw water contaminant levels and suitable installation and related flow adjustments, large cost efficiencies for desalination, for example, may be expected. Conservatively, sustained membrane flux rates between cleaning cycles could be expected to be at least double, and chemical and associated maintenance costs could be expected to be at least halved, and membrane replacements could be between 3 times to 10 times less frequent.

BRIEF SUMMARY OF THE INVENTION

The invention seeks to provide a water purification system, providing for the steps of introducing raw source water incorporating both inorganic and organic contaminants, settling out entrained material from the water, temporarily creating a calcium carbonate super saturation for depositing fragile crystalline carbonates for capturing organic contaminates, breaking off of said deposits into free particles, entraining them with the water stream, passing the water stream to a reverse osmosis filtration unit, continuously removing the inorganic contaminants and the calcium carbonate particles carrying the organic contaminants from the upstream side of the reverse osmosis system, while losing water molecules through the reverse osmosis membranes to produce desalted product water.

Preferably, the invention provides such a system incorporating a water purification pre-treatment device for removing organic contaminants from a water stream and having, an input chamber, an output chamber, an annular flow passage between said input and output chambers, a first magnetic ring around one side of the passage, and a magnetic member for the other side of said passage, the magnetic ring and magnetic member defining a restricted annular flow path between them for flow of water from one chamber to the other, a movable mounting connected to one of the magnetic ring or member whereby the space can be adjusted towards and away from each other to vary the dimensions of said passageway, a zinc anode body in said output chamber, mounted with water-excluding electrical contacts to the base of said output chamber; and a downstream flow pipe connected to said outlet chamber for flow of treated water therefrom.

Usefully the invention makes use of an ultra-strong rare-earth (neodymium-boron or equivalent) two-piece plug member and annular ring magnet that aligns its magnetic field perpendicular to water flow passing through the adjustable passageway.

Usefully there will be a seawater resistant plastic coating on the magnet surfaces that also incorporates powdered magnetite to help maintain magnet field strength through the coating into the water flow passageway Preferably the inlet chamber will comprise a circumferential flow bowl for spinning tangentially injected water from an outer rim towards the central magnetic passageway to develop accelerated and angled velocities for both a longer passageway flow path and a consequential higher passage velocity to enhance magnetic field action.

Preferably the outlet chamber will comprise a circumferential energy recovery bowl after passage of water through the magnetic passageway to retrieve most of the flow pressure losses incurred in speeding up water flow against centrifugal forces in advance of the magnetic passageway.

Usefully the zinc anode within the outlet chamber is sealed with O-ring seals to maintain corrosion-proof electrical contact for charging local metal components with anodic negative charge so that they will retain essential sites of nucleate carbonate scale adherent upon wetted surfaces for growing carbonate break-off particulates for capturing organic contaminants, and carrying their absorbed and denatured organics from the RO membrane surfaces to waste.

Preferably measurement markings are provided on an adjustment mounting to indicate the interior width settings of the magnetic passageway.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

DESCRIPTION OF A SPECIFIC EMBODIMENT

As already outlined above, the invention relates basically to the purification of raw water incorporating both inorganic contaminants and organic contaminants, in which the organic contaminants are of the type which can be removed by combining with calcium carbonate particles. Such raw water typically is sea water, but is obviously not exclusive to sea water but is applicable to any raw waters which require purification for consumption, or for use in any industrial process.

Figure 1:
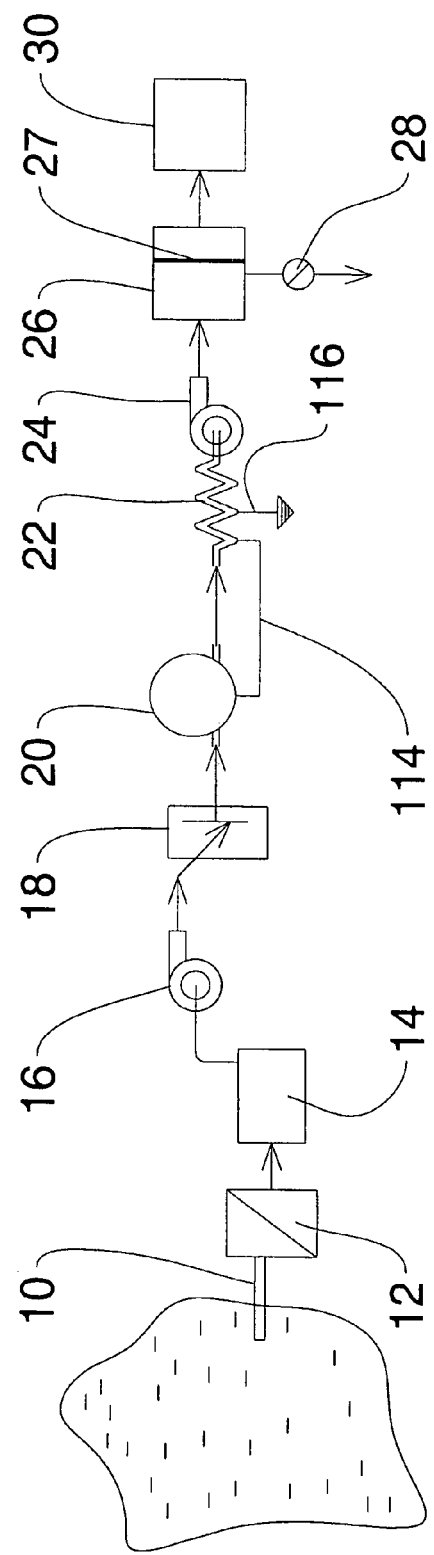
FIG. 1 is a schematic block diagram illustrating the entire process on the invention.

In general, a water purification system of this type will incorporate (FIG. 1) a plurality of components, many of which are known and conventional. In particular typical components will comprise an intake (10) typically being a pipe immersed in a source of water. In many cases such a pipe will extend a considerable distance off shore, so as to be drawing in cleaner water, than is available along the shore. Water is than passed through a coarse screen (12) which is a barrier to remove components in the water or indeed live creatures namely fish, shells, and also seaweed and large pollutant material. The water is then passed to a sediment basin (14), settling out silt.

From the sediment basin, where the water is essentially still, for at least a certain period of time, a water pump (16) pumps the water to a fine screen (18). The fine screen typically removes any material which will not settle readily out from the water in the settlement basin. This may include for example, plankton. The water is then passed directly to a pre-conditioning unit (20), the details of which will be described below. The result of passing through the conditioner is to create a temporary production of calcium carbonate particles, by breaking up the bi-carbonate ions present in the water, and then allowing the calcium carbonate particles to crystalize and absorb organic pollutants, in a manner described below.

From the conditioner (20) water containing both inorganic components and also calcium carbonate particles with absorbed organic material, passes through a grounded pipe (22). Passage through the grounded pipe assists in a more complete creation of carbonate crystal scales. The water then passes to a high pressure pump (24) which creates a high pressure and forces the water into a reverse osmosis unit (26). Waste water containing the inorganic material and the calcium carbonate particles is rejected from the upstream side of the reverse osmosis membrane (27) and is passed to waste (28). Water passing through the membrane (27), will be delivered to a storage tank (30), for distribution. This is a general description of the process of the invention. The rejection of the inorganic material and the created calcium carbonate particles with absorbed organic solutes takes place in the reverse osmosis unit itself. It is rejected continuously from the upstream side along with surplus water which is a fraction of the water passed into the unit.

Reverse osmosis systems avoid the inefficiencies of passing one hundred percent of the water itself through the purification membranes.

Therefore there is always a volume of waste water, in which the inorganic material and calcium carbonate particles are entrained and are rejected back to the raw water source.

It will be appreciated that this process does not increase the pollution of the raw water source, since the only material being returned to the raw water source is material which was extracted from it in the first place.

In accordance with the invention, the pre-treatment unit (20) is now described in more detail.

Figure 2:
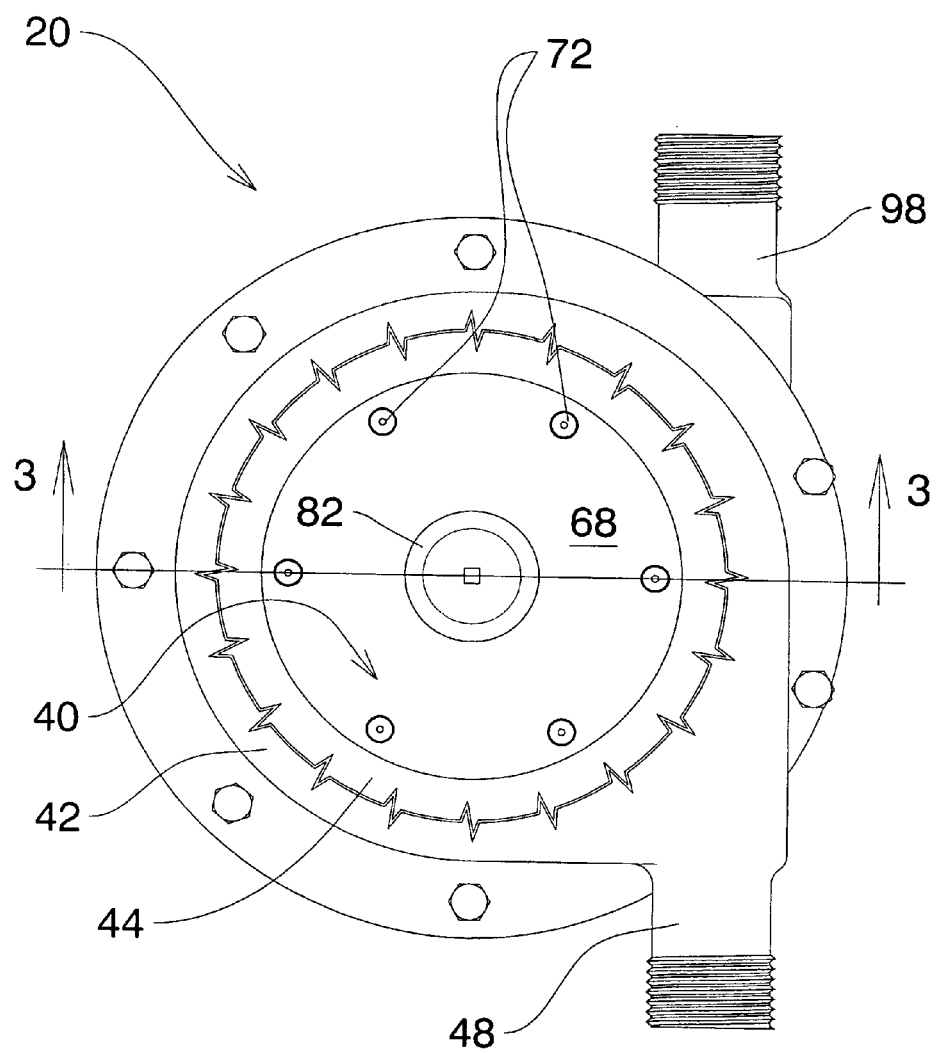
FIG. 2 is a transverse section of the pretreatment apparatus.
Figure 3:
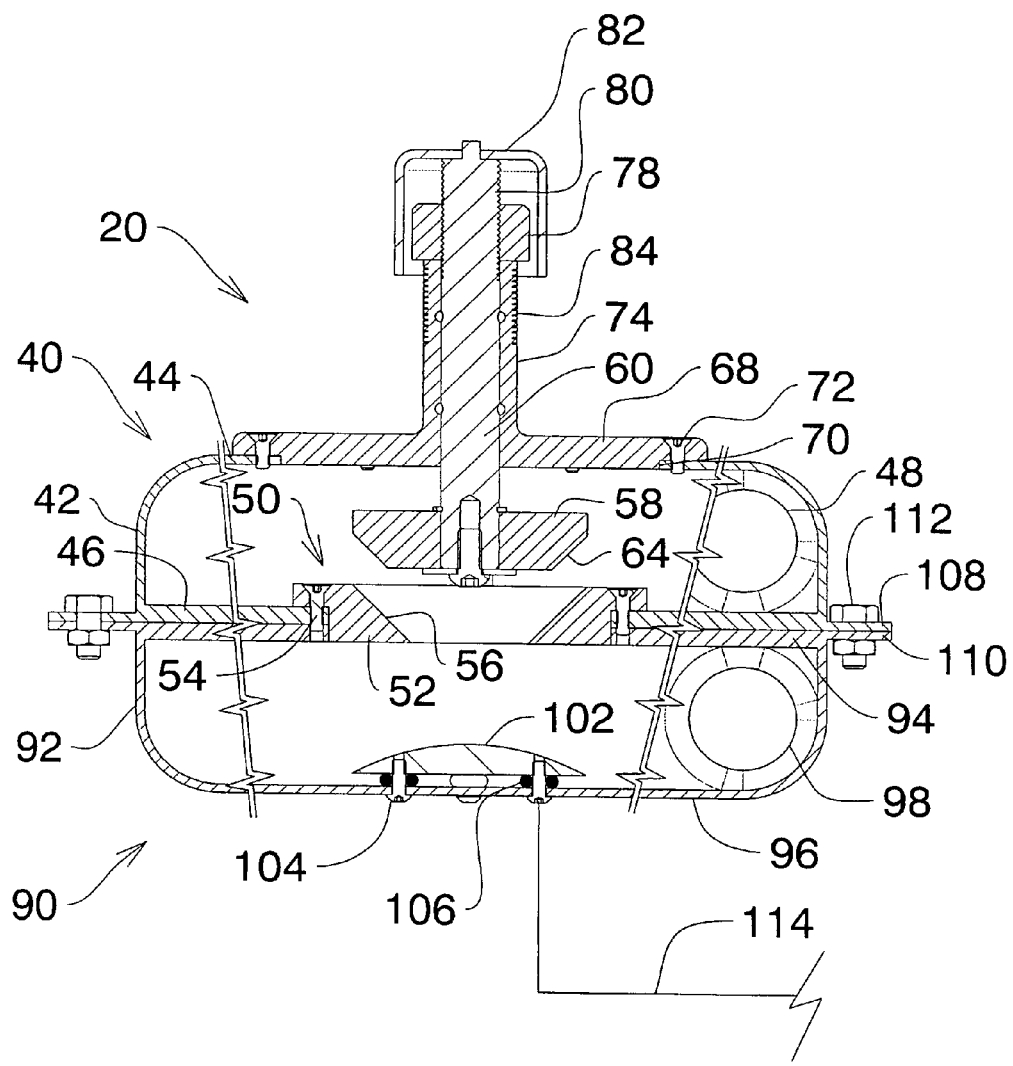
FIG. 3 is a section along line 3-3 of FIG. 2.

Referring now to FIGS. 2 and 3 it will be seen that the pre-treatment unit (20), comprises in this embodiment, an angular momentum spin-up bowl (40), of circular shape and defining a generally arcuate outer perimeter wall (42), and an upper planar wall (44) and a lower planar wall (46). A water inlet (48) is positioned, more or less tangentially so as to deliver incoming water around the arcuate periphery wall (42) of the spin up bowl. The lower planar wall (46) defines a central outlet opening (50). Around the central outlet opening (50) there is provided an annular magnetic ring (52) formed of ultra magnetic alloy. The annular ring (52) is secured in the opening by means such as screws (54). The annular ring (52) defines generally angled side walls (56), defining a circular opening, of progressively narrowing dimension, from top to bottom. A complimentary magnetic plug member (58) is formed of intense ultra magnetic alloy. The plug (58) is mounted on a movable spindle (60), which is adjustable vertically, thereby enabling the plug (58) to be moved towards or away from the ring (52). The plug (58) defines generally angular side walls (64), formed at angles complimentary to the angular side wall (56) of the ring (52). Ring (52) and member (58) can also be formed with protective corrosion resistant coatings containing magnetic minerals. Magnetite would be particularly suitable.

In this way, an outlet passageway of annular shape is provided which narrows progressively from the top of ring (52) to the bottom of ring (52). The width of the annular opening may be adjusted by moving the spindle (60).

In order to support the spindle (60) there is provided an access plate (68), secured to an opening (70) in the upper wall (44) by screws (72). A vertical guide sleeve (74) extends from plate (68) and the spindle (60) is located in the sleeve (74), being sealed by O-ring seals (76).

At the upper end of sleeve (74), there is an internally threaded nut (78), secured to the top of the sleeve (74). The spindle (60) is threaded with complimentary male threads (80). A manually operated cap (82) which may or may not have an additional operating arm attached (not shown) is secured to the top end of spindle (60).

An adjustment scale (84) is formed on the exterior of sleeve (74).

By rotating the cap (82), the spindle (60) can be moved downwardly or upwardly as desired. In this way the dimensions of the gap between the ring (52) and the plug (58) can be varied.

The pre-treatment unit (20) further comprises an angular energy recovery bowl (90), located beneath the spin-up bowl (40). While the two bowls are respectively shown as upper and lower in the illustration, it will be appreciated that this is without limitation. The arrangement of the spin-up bowl and the recovery bowl may be varied depending on circumstances.

The recovery bowl (90) is seen to comprise a generally circular chamber defined by an arcuate side wall (92), and an upper planar wall (94) and a lower planar wall (96). An outlet opening (98) is provided, more or less tangential to the arcuate side wall and will be connected down stream to the next piece of equipment, namely the grounded pipe (22).

The angular energy recovery bowl (90) defines an inlet opening (100) in its upper wall (94). The annular ring (52) in the spin-up bowl is of sufficient thickness that it extends down through the opening (100) in the upper wall of the recovery bowl (90). Thus the lower end of the opening defined by the annular ring passes water directly to the recovery bowl (90). Directly opposite to such annular ring, an anode block (102) is secured to lower wall (96) of the recovery bowl (90). The anode block (102) is preferably formed of zinc or aluminum metal. It is secured in place by means of bolts (104) passing through lower wall (96) and the bolts (104) are provided with O-rings (106), so as to protect the connection between the anode block (102) and the lower wall (96). The function of the anode block is to receive the direct impact of water flowing through the annular ring (52) and to provide a source of electrons for protecting calcium carbonate nucleation sites generating particles off of local plumbing while temporary super-saturation of the treated water with said mineral still prevails.

Within the recovery bowl (90) the water will then spin in an outward spiral until it reaches the arcuate side wall (92), and will then exit through the outlet (98).

In order to provide a secure integral construction, external upper and under junction flanges (108) (110) are provided on the respective spin-up bowl and recovery bowl, and they are united together by fastening such as bolts (112).

The function of the pre-treatment unit (20) will thus become more readily understood. Water will enter the spin-up bowl (40) through the inlet (48), and will spin around in a spiral fashion until it exits through the opening defined by the annular ring (52). Depending upon, the adjustment position of the plug (58), the water will flow at a greater or lesser velocity, but will have accumulated considerable speed and energy during its rotation. Water flow rate is determined by the system pump, whereas the velocity through the magnetic gap for passing said flow is the factor set by the gap to interact with the magnetic field. As water passes through the magnetic gap between the ring (52) and the plug (58), the calcium bicarbonate molecules are temporarily broken apart so as to provide a source of temporary calcium carbonate molecules, and free hydrogen. As the water containing the temporary separated molecules impacts on the anode block (102), the calcium carbonate will be combining with the organic contaminants in the water and depositing out as crystals. The high velocity of the water flow will however break up the formation of adhering crystals so that the water will contain volume of crystalline fragments or particles.

The high velocity of the water exiting the ring (52) and impacting on the anode block (102) will be largely recovered as energy in the outwardly flowing water in the recovery bowl, which then exits through the outlet (98). Water exiting through the outlet (98) will contain a proportionate size of crystalline calcium carbonate particles, incorporating organic contaminants.

This water is then passed through the grounded pipe plumbing unit (22) which further assists in the formation of crystalline calcium carbonate combined with organic contaminants.

The plumbing unit (22) generates additional crystalline calcium carbonate deposits while the "conditioned water" still retains much of its temporary calcium carbonate super saturation. Typically, some 10 to 15 feet long, plumbing unit (22) has pipe wall surfaces, which under appropriate conditions, acquire and retain calcium carbonate scale sites for sustaining the nucleation of further scale dendrites that break off as extra organic-scavenging particles.

To insure that such nucleating sites are retained in plumbing unit (22), particularly during non-flow periods, it is advantageous for the pipe to be of a single conductive metal, electrically connected as at (114) to the sacrificial zinc anode block (102), inside the bowl (90) itself.

The electrons available from the zinc's higher corrodability, protect carbonate deposit sites from the acid attack of ambient hydrogen ions (H*). The extra negatively-charged electrons (e–) from zinc block (102), aid in neutralizing such hydrogen ions into free hydrogen gas ($H_2$) before carbonates ($CO_3^=$) can be converted back to soluble bicarbonates ($HCO_3^-$).

Simple chemical equations such as:

$$2H^+ + 2e^- \rightarrow H_2 \text{ And } CO_3^= + H^+ \rightarrow HCO_3^-$$

may apply with the latter reaction being avoided by the electrons from the zinc block (102). Another problem arises from stray AC voltages from ubiquitous AC motors and related units which can cause electrolysis of sufficient potential across water-to-pipeline interfaces which "electro-clean" pipeline surfaces of their useful carbonate sites. For this reason, plumbing unit (22) is additionally grounded to earth, at (116), to short out such potential voltages.

These two features assist in maximizing the quantity of absorptive carbonate particles generated directly and thus minimizes the quantity of troublesome organic material which would otherwise foul RO membranes.

Any remaining calcium carbonate, which has not attracted the organic material, will be recombined with the hydrogen atoms to re-solubilize as calcium bicarbonate.

This water is then passed to the reverse osmosis unit (26). In this unit, the fine calcium carbonate crystalline particles will remain on the upstream side of the reverse osmosis membrane (not shown). Water molecules will pass through the membrane and constitute the purified water outlet sent to tank (30). Water which does not pass through the membrane will flow continuously out to waste (28). This will entrain the majority of the calcium carbonate crystalline particles, thus maintaining the membrane as far as possible free of contaminants and membrane blocking components. This will substantially increase regular flow and the useful life of the membranes.

The waste water containing such crystalline calcium carbonate will then be returned to the original source.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A water purification apparatus for treating water containing at least some organic contaminants, and having a pre-treatment device for removing organic contaminants from a water stream, and comprising;
   a circular spin up bowl having a perimeter wall defining a transverse maximum circumference;
   a water inlet in said spin up bowl located tangentially to said maximum circumference of said perimeter wall of said spin up bowl adapted to deliver water tangentially around said perimeter wall to create a vortex in said spin up bowl;
   said spin up bowl having a top wall and a bottom wall and a central axis;
   a recovery bowl;
   an annular water flow passageway in said bottom wall of said spin up bowl coaxial with said central axis of said spin up bowl and extending between said spin up and recovery bowls and connecting said spin up bowl to said recovery bowl;
   an annular magnetic member secured inside said flow passageway,
   said annular magnetic member defining a central circular opening of a first predetermined diameter defining a central flow axis for flow of water there through;
   a circular shaped magnetic body inside said spin up bowl positioned along said central flow axis of said central circular opening of said annular magnetic member said body defining annular surfaces of a second predetermined diameter greater than said first predetermined diameter wherein the magnetic member and the magnetic body define a restricted annular gap for flow of water between said magnetic member and said magnetic body from said spin up bowl to said recovery bowl;
   an adjustable support securing said magnetic body inside said spin up bowl whereby said magnetic body is moveable along said central flow axis relative to said annular magnetic member, to adjust said annular gap therebetween; and,
   an anode body located in said recovery bowl located on said central axis of said spin up bowl directly in line with said annular water flow passageway, to receive water exiting from said water flow passageway whereby said water exiting from said water flow passageway impinges directly onto said anode body.

2. A water purification apparatus as claimed in claim 1 wherein said recovery bowl is circular and including an outlet adjacent to the circumference of said recovery bowl.

3. A water purification apparatus as claimed in claim 2 wherein said magnetic member is a ring of magnetic material and wherein said magnetic body is circular, and dimensioned relative to said ring to define said restricted annular gap.

4. A water purification apparatus as claimed in claim 3 including a shaft attached to said magnetic body, the shaft being oriented normal to said magnetic member, and being moveable along said central axis of said magnetic member moving said magnetic body along said axis relative to said magnetic member.

5. A water purification apparatus as claimed in claim 4 including threading on said shaft, and a threaded adjustment member operable to move said shaft, and indicia indicating the position of said shaft.

6. A water purification apparatus as claimed in claim 1 wherein said anode body is zinc.

7. A water purification apparatus as claimed in claim 1 including bolts securing said anode body in said recovery bowl and sealing members protecting said bolts.

8. A water purification apparatus as claimed in claim 6 and including an electrically conductive pipe connected to said outlet of said recovery bowl, and an electrical connection from said pipe to said zinc anode body, and a ground connection from said pipe to ground.

9. A water purification apparatus as claimed in claim 1 wherein said spin up bowl defines a first junction wall and wherein said recovery bowl defines a second junction wall, said first and second junction walls lying against, one another, and including central openings in said first and second walls, with said magnetic member being located in said central opening in said first junction wall and fastenings, securing said magnetic member in said position.

10. A water purification apparatus as claimed in claim 9 wherein said spin up bowl has a first closure wall spaced from said first junction wall, and a bearing sleeve extending therefrom.

11. A water purification apparatus as claimed in claim 10 wherein said recovery bowl defines a second closure wall spaced from said second junction wall, and fastenings securing said first closure wall and said first junction wall to said second junction wall and said second closure wall.

* * * * *